United States Patent
Govindarajan

(10) Patent No.: US 7,236,981 B1
(45) Date of Patent: Jun. 26, 2007

(54) TECHNIQUE FOR GENERATING CODE TO IMPLEMENT VALUE OBJECTS FOR USE WITH DATABASE SYSTEMS

(75) Inventor: Jayesh Govindarajan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 10/323,154

(22) Filed: Dec. 17, 2002

(51) Int. Cl.
*G06F 7/00* (2006.01)

(52) U.S. Cl. .............. 707/102; 707/100; 707/101; 707/104.1

(58) Field of Classification Search .......... 707/1–104.1
See application file for complete search history.

(56) References Cited

U.S. PATENT DOCUMENTS

| | | | | |
|---|---|---|---|---|
| 5,499,371 A | * | 3/1996 | Henninger et al. | 717/108 |
| 5,875,334 A | * | 2/1999 | Chow et al. | 717/141 |
| 5,935,210 A | * | 8/1999 | Stark | 709/224 |
| 6,085,198 A | * | 7/2000 | Skinner et al. | 707/103 R |
| 6,684,207 B1 | * | 1/2004 | Greenfield et al. | 707/3 |
| 2002/0174417 A1 | * | 11/2002 | Sijacic et al. | 717/147 |
| 2002/0184401 A1 | * | 12/2002 | Kadel et al. | 709/315 |
| 2003/0018402 A1 | * | 1/2003 | Breunese | 700/31 |
| 2003/0025737 A1 | * | 2/2003 | Breinberg | 345/801 |
| 2004/0111464 A1 | * | 6/2004 | Ho et al. | 709/203 |

* cited by examiner

*Primary Examiner*—Alford Kindred
*Assistant Examiner*—Linh Black
(74) *Attorney, Agent, or Firm*—Hickman Palermo Truong & Becker LLP

(57) ABSTRACT

A technique for generating code to implement value objects is described. Code is generated by reading into an object generator a description of an interface for an object for use by a database application to access data managed by a database server. The object generator automatically generates code that implements the object based on the description and data types supported by the database server.

12 Claims, 3 Drawing Sheets

TECHNIQUE FOR GENERATING CODE TO IMPLEMENT VALUE OBJECTS FOR USE WITH DATABASE SYSTEMS

FIELD OF THE INVENTION

The present invention relates to database systems. More specifically, the present invention relates to a technique for generating code to implement value objects for use with database systems.

BACKGROUND OF THE INVENTION

Objects provide an interface to data stored in databases. Typically, objects in a database environment provide an interface to data stored in a database, so that the data may be viewed in a particular structure or association. Typically, objects may provide an interface to enable the data in a database to be viewed as associated attributes and values. For example, an attribute may correspond to an "employee name", and its value may correspond to a string of characters "John Doe".

While objects provide a valuable mechanism for interacting with databases, the construction of objects can become labor-intensive. Objects become complex as they are constructed and built upon. Difficulties arise when, for example, a database application requires use of an object to interface with data, where the object was created and used elsewhere to arrange the data in the database. In such scenarios, an object is constructed separately for use in a database application that interacts with the database.

One common approach provides for manually constructing the object for use with the database application resides. But manually constructing value objects for use with database systems is labor-intensive and error-prone. Often, hand-coded objects are constructed by retrieving data from the database, and reverse constructing the objects from the data. Furthermore, objects can become complex, having many dependent objects and attributes. As such, significant overhead is associated with manually constructing objects for use with database applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A technique is described for generating code to implement value objects for use with database systems. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the invention provide for an object generator that is configured to generate code that can be used to implement value objects for use with a database server. The object generator generates the code using an interface description.

In an embodiment, the object generator is read a description of an interface for an object that is to be used with a database application to access data managed by a database server. The object generator is automatically caused to generate code that can be used to implement the object. The code is generated based on the description and data types supported by the database server.

In one embodiment, at least part of the description of the interface includes a description of a method that involves a data type that is not supported by the database server. The object generator may be configured to generate an implementation for the method that includes logic for converting between a data type that is supported by the database server and the data type that is not supported by the database server.

In an embodiment, the description of the interface may be in the form of metadata. The metadata includes text descriptions. The description of the interface may include a description of the attribute for an object, the data type associated with the attribute, and the method that is to be implemented for accessing a value associated with the attribute.

In another embodiment, the description of the interface may include a description of a dependent object. A dependent object is an attribute of another object, where that attribute itself is an object with its own attributes. The object generator may be configured to automatically generate code that implements the dependent object.

Functional Description

Figure 1:
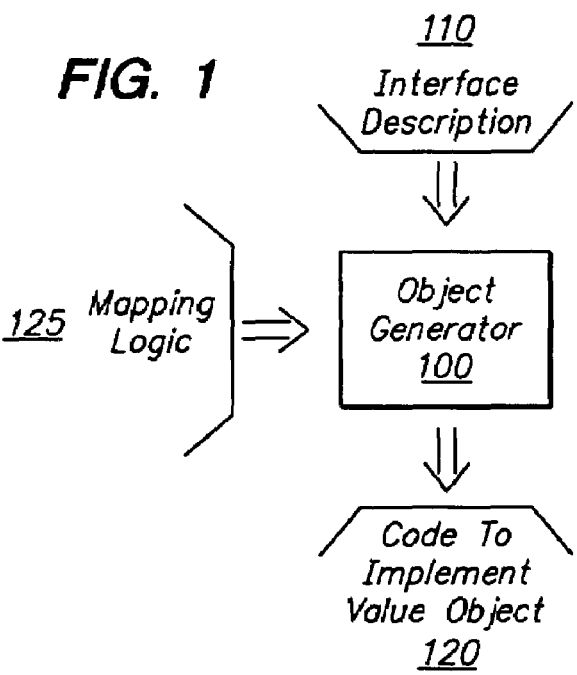
FIG. 1 is a block diagram illustrating functionality of an object generator.

FIG. 1 is a block diagram illustrating functionality of an object generator 100, under an embodiment of the invention. The object generator 100 operates in conjunction with a database system. The object generator 100 is used to generate code for implementing objects that provide interfaces to data in a database of the database system.

In an embodiment, an input 110 into object generator 100 includes an interface description. An output 120 of object generator 100 is code to implement an object, and specifically to implement one or more methods of the object. Mapping logic 125 may be utilized to generate the code from the interface description.

The interface description included in input 110 may be provided as a set metadata. The metadata may specify methods for accessing data in the database, including attribute names that are to be used by the methods, and the data types that are returned or employed by the methods. An example of a set of metadata that provides the interface description for object generator 100 is:

string getname ( )
  setname (string)

In the example provided, the left column specifies a method for an attribute, and the right column specifies a data type of the attribute. The metadata description "getname (string)" means that for an attribute "name", a method "getname" is to be implemented that returns a value from the database having a data type that is a string. Likewise, the metadata description "setname(string)" means that for an attribute "name", a method "setname" is to be implemented that sets in the database a value having a data type that is a string.

The metadata description may also specify a dependent object as an attribute. As with other attributes, the dependent object may be subject to its own methods and attributes. A dependent object may have its own dependent objects. The metadata may describe the object data type as an object by specifying the object name for the attribute's data type. For example, the following description may be provided for methods that use an attribute corresponding to a dependent object:

employee getemployee ( )
  setemployee (employee)

The object generator 100 includes logic for automatically generating output 120. At least some of the logic employed by object generator 100 includes mapping logic 125. The mapping logic 125 maps specific items of the interface description with instructions for generating code to implement methods that incorporate those specific items. The mapping logic 125 may be input into object generator 100. Alternatively, mapping logic 125 may be a permanent part of object generator 100.

The output 120 of object generator 100 includes code to implement a value object for use with database systems. The value object may be implemented by implementing its methods for writing and reading data from the database. For example, pseudo-code that may result as output 120 for the description of provided for the attribute "name" may include:

getname
  getattribute ("name")
  setname
  setAttribute ("name")

The code is the result of logic that maps metadata that specifies the methods "getname" and "setname", as well as data types for those methods, into the implementation above. Attributes that are dependent objects may be addressed using the same type of methods, but the metadata informs the object generator 100 that the attribute is a dependent object. The object generator 100 is configured to implement the dependent object, including its methods, separately when implementing the value object.

According to an embodiment, generated code of output 120 may be used as part of a database application on a client of a database system. The code enables the creation of instances of generated classes corresponding to one or more value objects, each of which may be part of the database application. The database application may then use the objects as an interface for data stored in a database.

Database System with Value Object Generator

Figure 2:
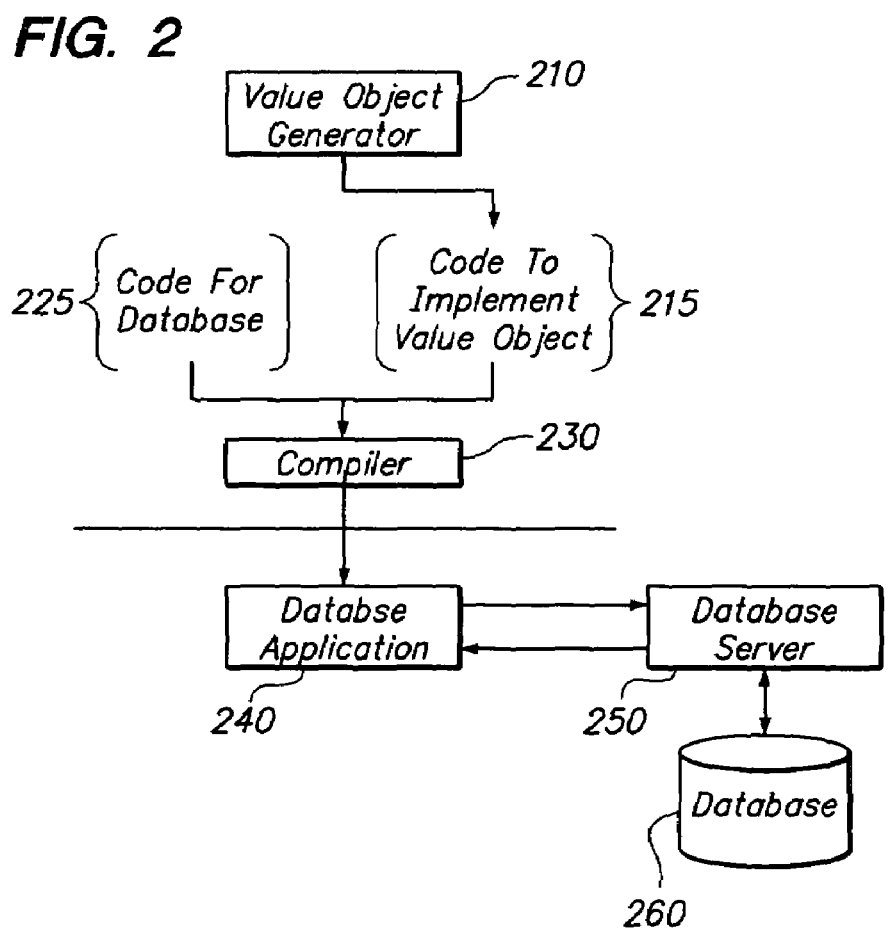
FIG. 2 is a block diagram illustrating a value object generator in a database system.

FIG. 2 is a block diagram illustrating a value object generator in a database system. According to an embodiment, a value object generator 210 automatically generates a first section of code 215 to implement one or more value objects for use with a database system. The first section of code 215 may be automatically generated using an interface description for a database 260 of the database system. A second section of code 225 includes code provided by a developer for operating a database application 240. A compiler 230 compiles the first section of code 215 and the second section of code 225 to generate the database application 240. The database application 240 is configured to communicate with a database server 250 of the database system. The database server 250 manages database 260.

The object generator 210 may be configured in a manner described with FIG. 1. In an embodiment, a set of metadata that describes an interface for one or more objects is used to automatically generate the first section of code 215. Logic to map specific items in the set of metadata, including items describing methods for accessing data from a database, are mapped into code to implement the one or more objects.

In an embodiment, the first section of code 215 includes methods for writing data to and/or reading data from database 260. For example, in a JAVA programming language, a series of get and/or set type methods may be included in the first section of code 215. The get and/or set methods may be for a particular attribute identified by the set of metadata.

The second section of code 225 may include code for executing the database application 240, including code for querying database server 250. The second section of code 225 may be manually created. It is possible for the second section of code 225 to include manually created objects and methods for interfacing with database 260.

Once the database application 260 is generated, it may retrieve data and write data to database 260 through database server 250. One or more interfaces to data accessed by database application 240 may be provided by the objects implemented in first section of code 215. The database application 240 may query database server 250 using, for example, structured query language commands.

The database server 250 manages the database 260 by responding to queries from database application 240. Data may be retrieved from database 260 and sent to database application 240 in response to read commands from the database application. Data may be written into the database 260 in response to write commands from database application 240. The data objects enable the database application 240 to access and use the arrangement of the data from the database when making its command to write and read from the database.

Methodologies for Generating Code to Implement Value Objects

Figure 3:
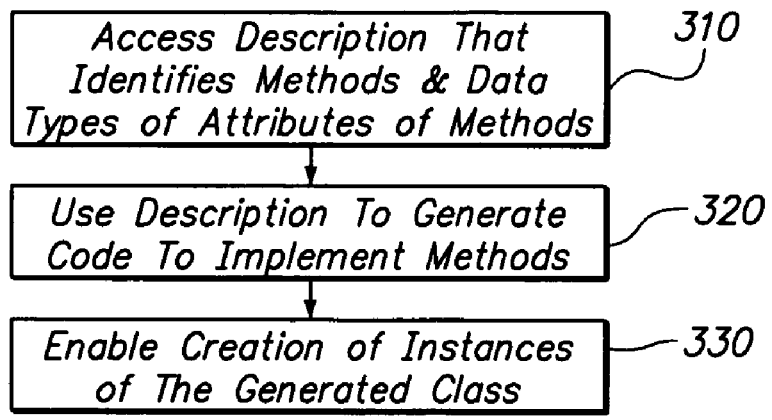
FIG. 3 illustrates a method for enabling the creation of instances of generated classes for use by a database system.

FIG. 3 illustrates a method for enabling the creation of instances of generated classes for use by a database system. A method such as described may be implemented using a system such as described with FIG. 2.

In step 310, a description is accessed that identifies methods and data types of attributes used for methods of a particular class. The description may be in the form of metadata. In one embodiment, metadata forming the description may describe attributes of the class, the data type associated with the attributes, and methods that are to be implemented for accessing a value associated with each of the attributes.

In step 320, the description is used to automatically generate code to implement the methods of the class. The methods include, for example, "get" and "set" type methods in the JAVA programming language. The methods are for the attributes in the description. The data types of values returned or otherwise used by the methods is anticipated from the description provided in the previous step.

Step 330 enables the creation of instances of the generated class. In an embodiment, the creation of instances may be enabled for use with database applications that are configured to access a database. For example, code generated in step 320 may be provided for compilation in order to configure or construct a database application to include the value objects implemented from the generated code.

Figure 4:
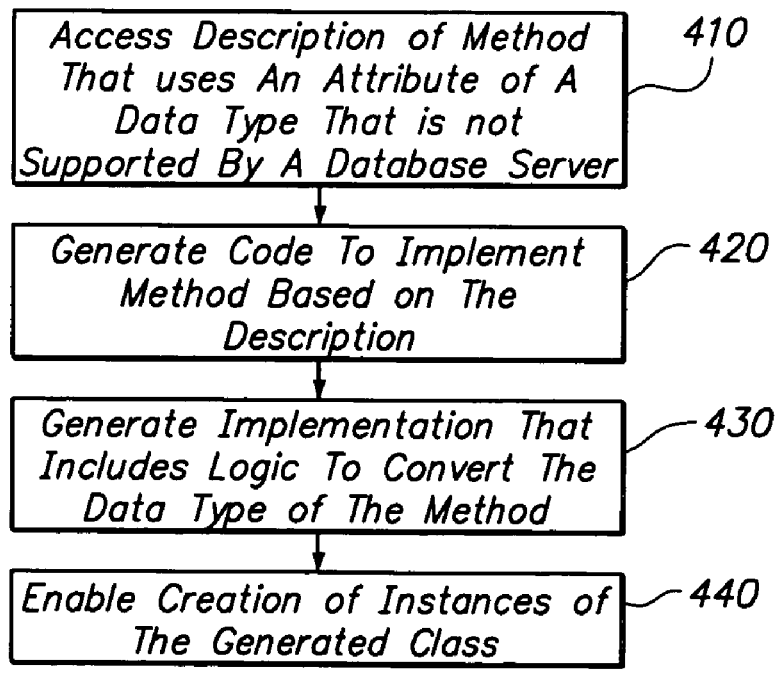
FIG. 4 illustrates a method for enabling the creation of instances of generated classes for use by database applications, where data types used by the classes are not supported by a database server that communicates with the database application.

FIG. 4 illustrates a method for enabling the creation of instances of generated classes for use by database applications, where data types used by the classes are not supported by a database server that communicates with the database application.

In step 410, a description is accessed of a method that uses an attribute of a data type not supported by the database server. For example, in FIG. 2, database application 240 may support data types that are "integer" or "floating", while database server 250 and database 260 do not support such data types. The description of the method specifies the data type used by the method. Thus, for example, for an attribute "num" and method "getnum", the data type may be described as being an integer, even though database server 250 does not support integers as a data type.

Step 420 provides that code is automatically generated to implemented the method based on the description of the method.

Step 430 provides that an implementation is generated that includes logic to convert the data type of the method. The implementation with the logic may be created automatically. Furthermore, steps 420 and 430 may be performed together. The logic may be based on the description of the method The logic may convert the data type of the method from a data type supported by the database server to the data type supported by the method. The logic may also make the reverse conversion to convert from the data type supported by the method to the data type supported by the database. The particular conversion performed depends on whether the method is to write or read data from the database.

Step 440 enables creation of instances of the generated class. The class may be instantiated to implement the method as part of the object, with logic to convert the data types of the methods. Thus, the creation of instances may be enabled by enabling integration of code and logic generated in steps 420 and 430 into a database application for use in accessing data from a database system.

Hardware Overview

Figure 5:
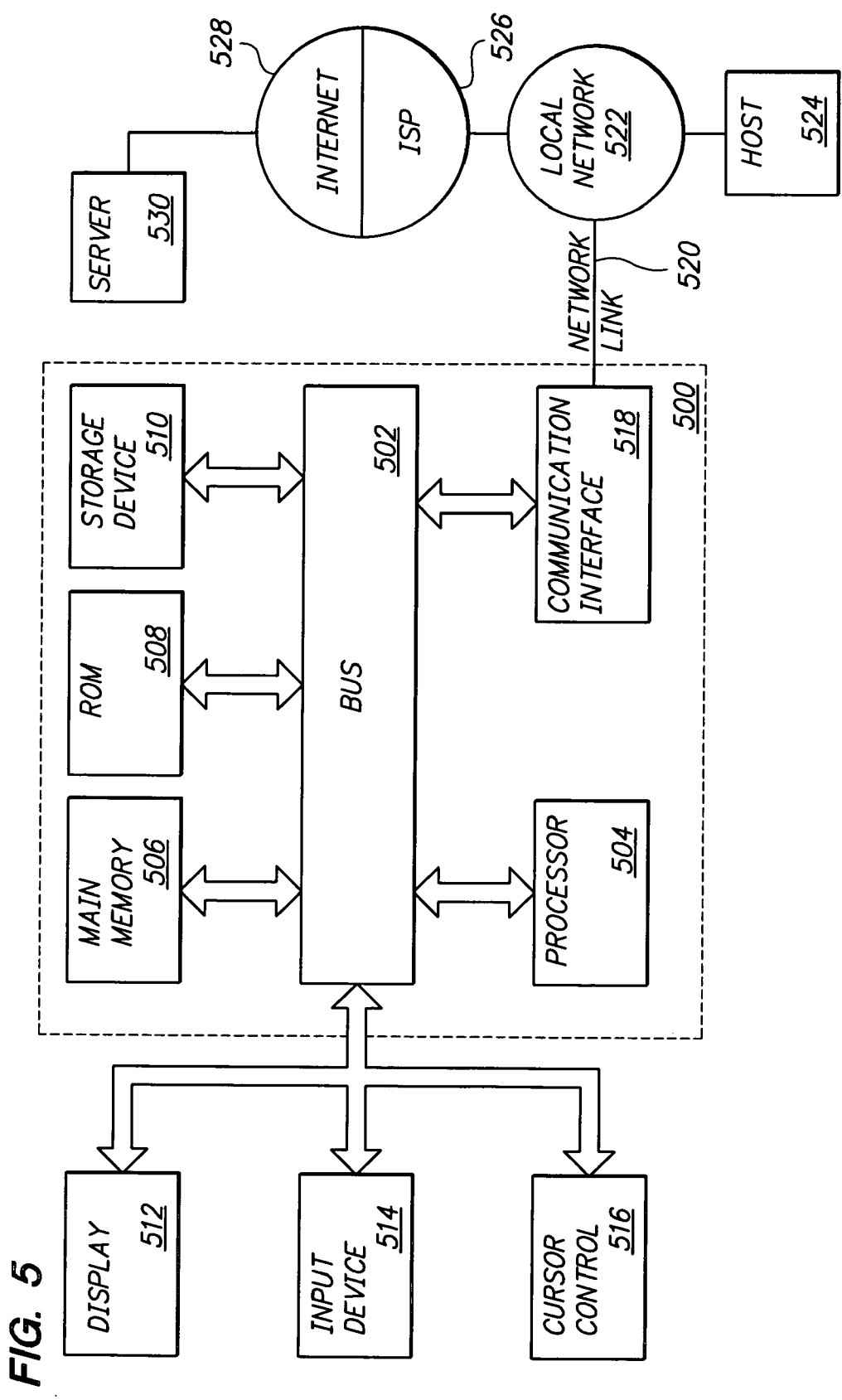
FIG. 5 is a block diagram that illustrates a computer system 500 upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating code, the method comprising:
    reading into an object generator a description of an interface for an object for use by a database application to access data managed by a database server, wherein said description describes a plurality of methods to access the data managed by the database server, wherein reading into the object generator includes reading a set of metadata describing an attribute of the object, a data type associated with the attribute, and a particular method of said plurality of methods that is to be implemented for accessing a value associated with the attribute, and wherein a description for the particular method involves a data type that is not supported by the database server;
    causing the object generator to automatically generate code that implements the object based on the description and data types supported by the database server, wherein said code implements each of said methods; and wherein causing the object generator to automatically generate code includes generating an implementation for the particular method that includes logic for converting between a data type that is supported by the database server and the data type that is not supported by the database server;
    storing the automatically generated code in a computer readable medium.

2. The method of claim 1, wherein reading into an object generator a description of an interface includes reading into the object generator a description of a dependent object.

3. The method of claim 2, wherein causing the object generator to automatically generate code that implements the object includes causing the object generator to automatically generate code that implements the dependent object.

4. A database system comprising:
    a database server to manage a database;
    a database application generated using code from an object generator that is configured to:
        identify a description of an interface, wherein the interface is for an object that can be used by a database application to access data in the database, wherein said description describes a plurality of methods to access the data managed by the database server; wherein the interface that is identified by the object generator includes, for each said method, a set of metadata describing an attribute of the method, a data type associated with the attribute, and a description of the method that is to be implemented for accessing a value associated with the attribute; and
    wherein the interface that is identified by the object generator includes a description for a particular method that involves a data type that is not supported by the database server;
        cause the object generator to automatically generate code that implements the object based on the description and data type supported by the database server, wherein said code implements each of said methods; wherein the object that is implemented by the object generator includes an implementation for the particular method that includes logic for converting between a data type that is supported by the database server and the data type that is not supported by the database server; and
        store the automatically generated code in a computer readable medium.

5. The database system of claim 4, wherein the object that is implemented by the object generator comprises a method for writing data to the database.

6. The database system of claim 4, wherein the object that is implemented by the object generator comprises a method for reading data from the database.

7. The database system of claim 4, wherein the database application is generated by compiling code, including code generated from the object generator.

8. The database system of claim 4, wherein the interface that is identified by the object generator includes a description of a dependent object.

9. The database system of claim 8, wherein the object that is implemented by the object generator implements the dependent object.

10. A computer-readable medium carrying one or more sequences of instructions for generating code, wherein execution of the one or more sequences of instructions by one or more processors causes the one or more processors to perform the steps of:

reading into an object generator a description of an interface for an object for use by a database application to access data managed by a database server, wherein said description describes a plurality of methods to access the data managed by the database server, wherein reading into the object generator includes reading a set of metadata describing an attribute of the object, a data type associated with the attribute, and a particular method of said plurality of methods that is to be implemented for accessing a value associated with the attribute, and wherein a description for the particular method involves a data type that is not supported by the database server;

causing the object generator to automatically generate code that implements the object based on the description and data types supported by the database server, and wherein said code implements each of said methods; wherein causing the object generator to automatically generate code includes generating an implementation for the particular method that includes logic for converting between a data type that is supported by the database server and the data type that is not supported by the database server; and storing the automatically generated code in a computer readable medium.

11. The computer-readable medium of claim 10, wherein instructions for reading into an object generator a description of an interface include instructions for reading into the object generator a description of a dependent object.

12. The computer-readable medium of claim 11, wherein instructions for causing the object generator to automatically generate code that implements the object include instructions for causing the object generator to automatically generate code that implements the dependent object.

* * * * *